US 8,946,965 B2

(12) United States Patent
Chiba et al.

(10) Patent No.: US 8,946,965 B2
(45) Date of Patent: Feb. 3, 2015

(54) ARMATURE OF ELECTRIC MOTOR AND ELECTRIC MOTOR

(75) Inventors: Teiichirou Chiba, Hiratsuka (JP); Tsuyoshi Kobayakawa, Isehara (JP); Daisuke Yoshida, Hadano (JP)

(73) Assignee: Komatsu Ltd., Tokyo (JP)

( * ) Notice: Subject to any disclaimer, the term of this patent is extended or adjusted under 35 U.S.C. 154(b) by 515 days.

(21) Appl. No.: 13/127,264

(22) PCT Filed: Dec. 21, 2009

(86) PCT No.: PCT/JP2009/071252
§ 371 (c)(1),
(2), (4) Date: May 3, 2011

(87) PCT Pub. No.: WO2010/074036
PCT Pub. Date: Jul. 1, 2010

(65) Prior Publication Data
US 2011/0210641 A1  Sep. 1, 2011

(30) Foreign Application Priority Data

Dec. 26, 2008  (JP) ................................. 2008-334044

(51) Int. Cl.
*H02K 3/28* (2006.01)
*H02K 15/06* (2006.01)
*H02K 1/27* (2006.01)

(52) U.S. Cl.
CPC ............... *H02K 3/28* (2013.01); *H02K 15/068* (2013.01); *H02K 1/2766* (2013.01)
USPC ........................................................ 310/208

(58) Field of Classification Search
USPC ....................................................... 310/208
See application file for complete search history.

(56) References Cited

U.S. PATENT DOCUMENTS

| 4,857,787 | A  | * | 8/1989  | Taji et al. ...................... 310/180 |
| 5,804,902 | A  | * | 9/1998  | Hill ................................ 310/179 |
| 6,107,718 | A  | * | 8/2000  | Schustek et al. ........ 310/216.086 |
| 6,441,527 | B1 | * | 8/2002  | Taji et al. ...................... 310/201 |
| 6,806,611 | B2 | * | 10/2004 | Bharaj et al. .................. 310/208 |
| 2003/0151325 | A1 | * | 8/2003 | Bharaj et al. .................. 310/201 |
| 2009/0072653 | A1 | * | 3/2009 | Harada et al. ................. 310/208 |

FOREIGN PATENT DOCUMENTS

| JP | 8-182235 A   | 7/1996 |
| JP | 8-182238 A   | 7/1996 |
| JP | 10-174329 A  | 6/1998 |
| JP | 2003-204659 A | 7/2003 |
| JP | 2005-110342 A | 4/2005 |
| JP | 2008-109829 A | 5/2008 |
| JP | 2008-148375 A | 6/2008 |

OTHER PUBLICATIONS

International Search Report of corresponding PCT Application No. PCT/JP2009/071252.

* cited by examiner

*Primary Examiner* — Tran Nguyen
(74) *Attorney, Agent, or Firm* — Global IP Counselors, LLP

(57) ABSTRACT

An armature of an electric motor includes a core and a winding. The core has a plurality of slots and a plurality of teeth formed between the slots. The winding is composed of a plurality of wires. The winding has a plurality of coil parts and connecting portions. The coil parts are inserted into the slots and wound around and across the teeth. The connecting portions connect the coil parts together. The winding has a twisted shape in the connecting portions.

8 Claims, 10 Drawing Sheets

ARMATURE OF ELECTRIC MOTOR AND ELECTRIC MOTOR

CROSS-REFERENCE TO RELATED APPLICATIONS

This national phase application claims priority to Japanese Patent Application No. 2008-292887 filed on Dec. 26, 2008. The entire disclosure of Japanese Patent Application No. 2008-334044 is hereby incorporated herein by reference.

TECHNICAL FIELD

The present invention relates to an armature of an electric motor and an electric motor.

BACKGROUND ART

An armature of an electric motor is generally provided with a core and a winding wound around the core. The winding is composed of a plurality of wires bundled together, and has a plurality of coil parts formed into the shape of a coil and connecting portions for connecting the coil parts together. The core is provided with a plurality of slots and has a coils side of the coil parts embedded in the slots.

A method for manufacturing an armature such as that described above is disclosed in, e.g., Japanese Laid-open Patent Application No. 2005-110342.

First, a single coil part is formed by winding a winding on a winding frame. Here, a winding 110 is wound on a winding frame 130 by moving a flyer 120 for guiding the winding 110 composed of a plurality of wires W around the winding frame 130, as shown in FIG. 8. A coil part 100 is thereby formed in a shape in which a plurality of strip-shaped wires W are wound in a helical shape. Next, the coil part 100 is pressed down and out from the winding frame 130 and moved to a transfer tool 140. The transfer tool 140 is a member for mounting the winding 110 on a core 150 (see FIG. 11) and is capable of circularly arranging and holding the plurality of coil parts 100 to 107 (see FIGS. 9 and 10).

The coil part 100 described above is moved to the transfer tool 140, after which a connecting portion 111 is formed before the winding of the next coil part 101 begins. The connecting portion 111 is formed in sequence from the winding 110 forming the coil part 100, and is a portion that extends to the adjacent coil part 101. The connecting portion 111 is formed by rotatably moving the transfer tool 140 or the winding frame 130 about the axial line of the transfer tool 140. The next coil part 101 is then formed from the same winding 110 and moved to the transfer tool 140.

The above operation is repeated, and the state shown in FIG. 9 is achieved when the formation and transfer of the required number of coil parts 100 to 107 and connecting portions 111 to 117 to the transfer tool 140 have been completed. At this point, as viewed from above, a plurality of coil parts 100 to 107 are arrayed in a circle about the periphery of a stripper 141 of the transfer tool 140. Mutually adjacent coil parts 100 to 107 are formed so that the winding directions are opposite from each other.

Next, the core 150 is arranged above the transfer tool 140, as shown in FIG. 10. FIG. 10 is a cross-sectional view along the line X-X in FIG. 9. The core 150 has a plurality of slots formed in the internal peripheral surface (see FIG. 2). The coil parts 100 to 107 are lifted upward when the stripper 141 ascends. The coils sides of the coil parts 100 to 107 are thereby inserted into the corresponding slots, as shown in FIG. 11. FIG. 11 shows a state in which the coil side 121 (see FIG. 9) of the coil part 100 is inserted into the slot S100 of the core 150, and the coil side 122 (see FIG. 9) of the coil part 103 is inserted into the slot S103.

SUMMARY

However, with a method such as that noted above, the relative arrangement of the plurality of wires W is maintained from the start of winding to the end of winding of the winding 110 across the plurality of coil parts 100 to 107 in a state in which the plurality of coil parts 100 to 107 are held on the transfer tool 140. For example, in FIG. 10, the wire W1, which is in the highest position among the turn portions of a coil part 100, is in the highest position in the other turn portions of the coil part 100 as well. This means that the wire W1 will be in the highest position in all of the turn portions of the other coil parts 101 to 107. The relative arrangement from the first wire W1 to the $N^{th}$ wire Wn is thus substantially maintained in each of the turn portions of all the coil ports 100 to 107 for N number of wires from the first wire W1 to the $N^{th}$ wire Wn included in the winding 110.

As described above, when the coil parts 100 to 107 set in the transfer tool 140 are inserted in the slots using the stripper 141, the plurality of wires W1 to Wn are inserted into slots in sequential fashion from the wire W1 positioned on the upper side of the transfer tool 140 without exception. Accordingly, the first wire W1 to the $N^{th}$ wire Wn are substantially sequentially accommodated from the depth side in the slots as well.

Therefore, with an armature of an electric motor manufactured using a conventional method such as that described above, a plurality of wires are packed into the slots in sequential fashion from the depth side substantially in accordance with the order of insertion in the turn portions of the windings.

As a result, the first wire W1 among the wires accommodated in the slot forms the coil parts 100 to 107 while continually passing through the slot in increasing depth relative to the other wires, and the $N^{th}$ wire Wn forms the coil parts 100 to 107 while continually passing through the slot in decreasing depth relative to the other wires, as shown in FIG. 12. Accordingly, the inductance of the coil part formed by the wires is greatest in the first wire W1, and is the least in the $N^{th}$ wire Wn (W15 in FIG. 15), as shown in FIG. 13. Such inductance nonuniformity in each wire is the cause of lower coil efficiency and reduced motor efficiency.

An object of the present invention is to provide an armature of an electric motor and an electric motor that can improve motor efficiency.

The armature of an electric motor according to a first aspect includes a core and a winding. The core includes a plurality of slots and a plurality of teeth formed between the slots. The winding is made of a plurality of wires. The winding includes coil parts and connecting portions. The coil parts are inserted into the slots and wound around the teeth. The connecting portions connect the coil parts together. The winding has a twisted shape in the connecting portion.

With the armature of an electric motor according to the aspect described above, the relative arrangement of the plurality of wires in the winding varies because the winding has a twisted shape in the connecting portions in a coil structure having a "distributed" winding. Accordingly, coil inductance nonuniformity in each wire is reduced. Motor efficiency can thereby be improved.

The armature of an electric motor according to a second aspect is the armature of an electric motor of the first aspect, wherein the connecting portions are provided from a tip side of the teeth to a base side of the teeth.

With the armature of an electric motor according to the aspect described above, a plurality of coil parts connected by connecting portions is formed in advance, and workflow is facilitated when the plurality of coil parts is mounted in unison on the core. Accordingly, the manufacturing step can be readily automated.

The armature of an electric motor according to a third aspect is the armature of an electric motor of the first aspect, wherein the winding in the connecting portions are twisted at an angle of 180°.

With the armature of an electric motor according to the aspect described above, the arrangement of the wires is reversed in adjacent twisted portions. For example, a given wire is switched in position between the side of a tooth closest to the tip and the side of a tooth closest to the base, adjacent to the twisted portions. Inductance nonuniformity for each wire can thereby be reduced.

The electric motor according to a fourth aspect comprises the armature recited in any of the first to third aspects as a stator.

With the armature of an electric motor according to the aspect described above, the efficiency of the armature as a stator can be improved.

In the present invention, inductance nonuniformity for each wire in a winding is reduced. Motor efficiency can thereby be improved.

DETAILED DESCRIPTION OF EMBODIMENTS
CONFIGURATION

Figure 1:
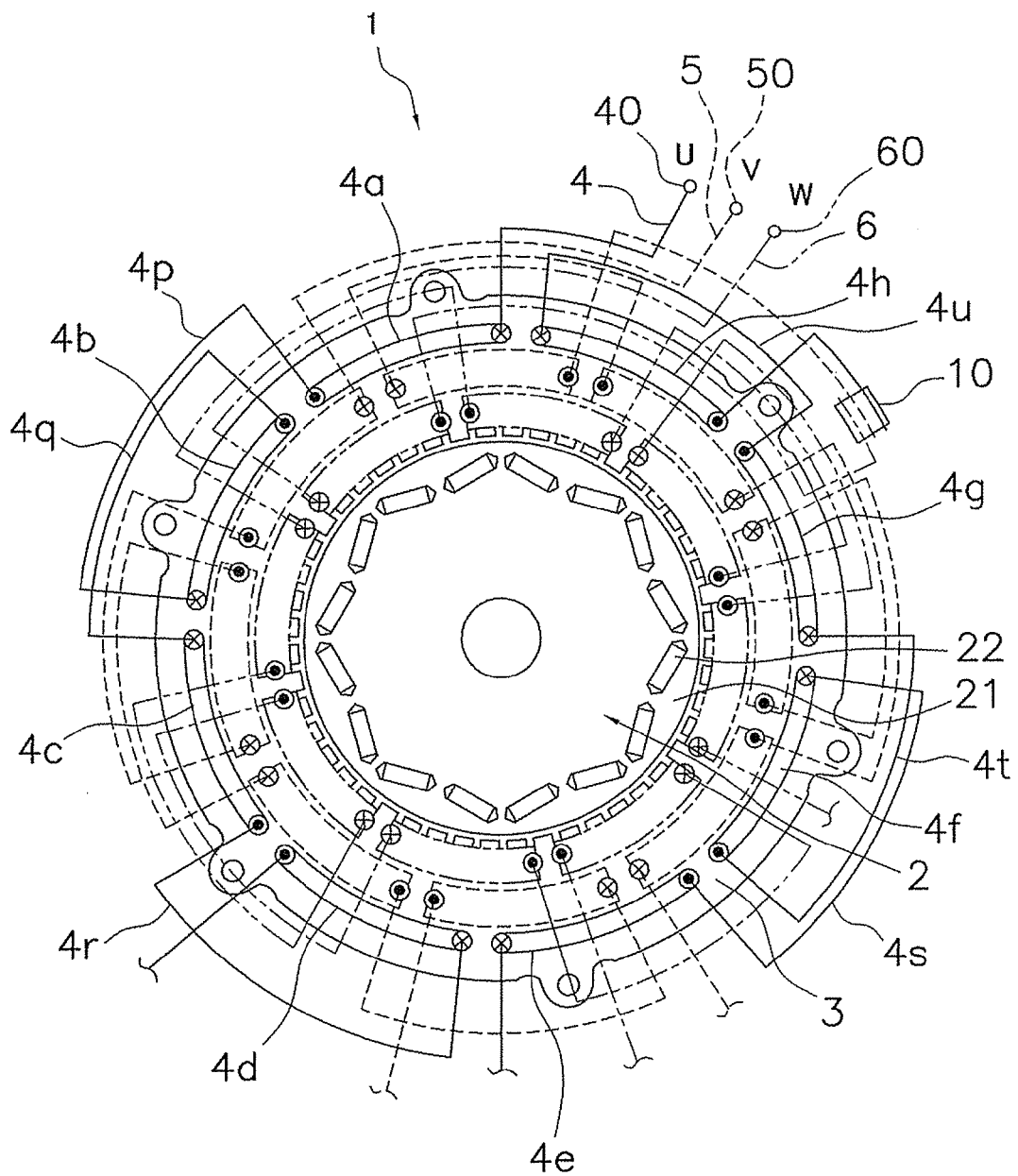
FIG. 1 is a schematic view showing the configuration of an electric motor according to the first embodiment.

FIG. 1 shows an electric motor 1 according to an embodiment of the present invention. The electric motor 1 is, e.g., an embedded-type magnetic motor, or another three-phase synchronous motor, and is provided with a rotor 2 and stator 3.

The rotor 2 is an 8-pole permanent magnet rotor. The rotor 2 has a rotor main body 21 and a plurality of permanent magnets 22. The rotor main body 21 has a cylindrical shape and is rotatably provided to the main casing (not shown) about the center of the axis of rotation. The permanent magnets 22 are mounted on the rotor main body 21. In FIG. 1, reference numerals are provided to only a portion of the permanent magnets, and the other reference numerals have been omitted.

The stator 3 is a "distributed-winding" stator having three phases and 48 slots. The stator 3 has a core 31 and windings 4 to 6.

Figure 2:
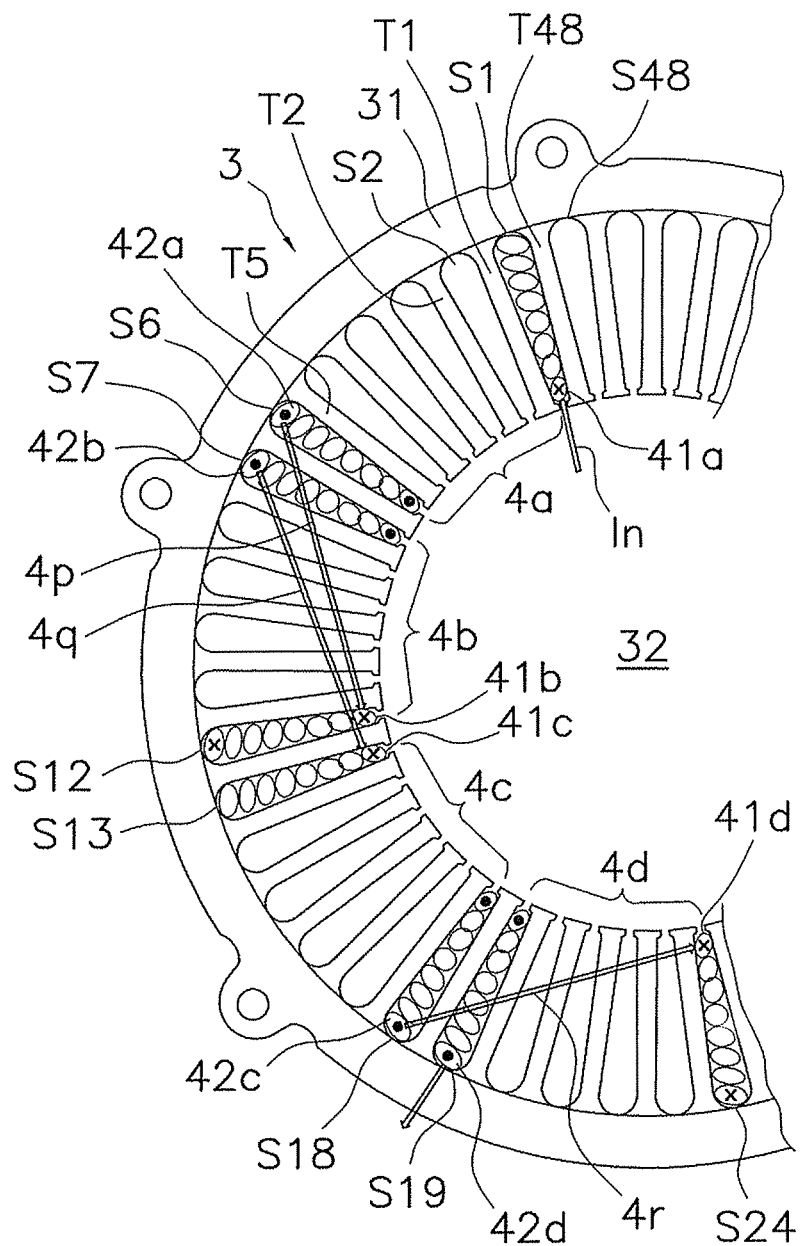
FIG. 2 is a schematic view showing the configuration of a stator according to the first embodiment.

The core 31 has a substantially cylindrical external shape and is provided with a through-hole 32 that extends along the central axis, as shown in FIG. 2. A plurality of slots S1 to S48 is provided to the internal peripheral surface of the core 31. The slots S1 to S48 extend along the direction parallel to the central axis. The teeth T1 to T48 are formed between the slots S1 to S48. Here, the 48 slots S1 to S48 and teeth T1 to T48 are provided. In FIG. 2, reference numerals are provided to only a portion of the slots and teeth, and the other reference numerals are omitted.

The windings 4 to 6 have three windings, i.e., a U-phase winding 4, a V-phase winding 5, and a W-phase winding 6, as shown in FIG. 1. A U-phase terminal 40 is provided to one end of the U-phase winding 4. A V-phase terminal 50 is provided to one end of the V-phase winding 5. A W-phase terminal 60 is provided to one end of the U-phase winding 6. The other ends of the U-phase winding 4, V-phase winding 5, and W-phase winding 6 are terminated by a neutral point 10. These windings 4 to 6 have substantially the same structure except for the different slots S51 to S48 into which they are to be inserted; therefore, only the U-phase winding 4 will be described.

Figure 3:
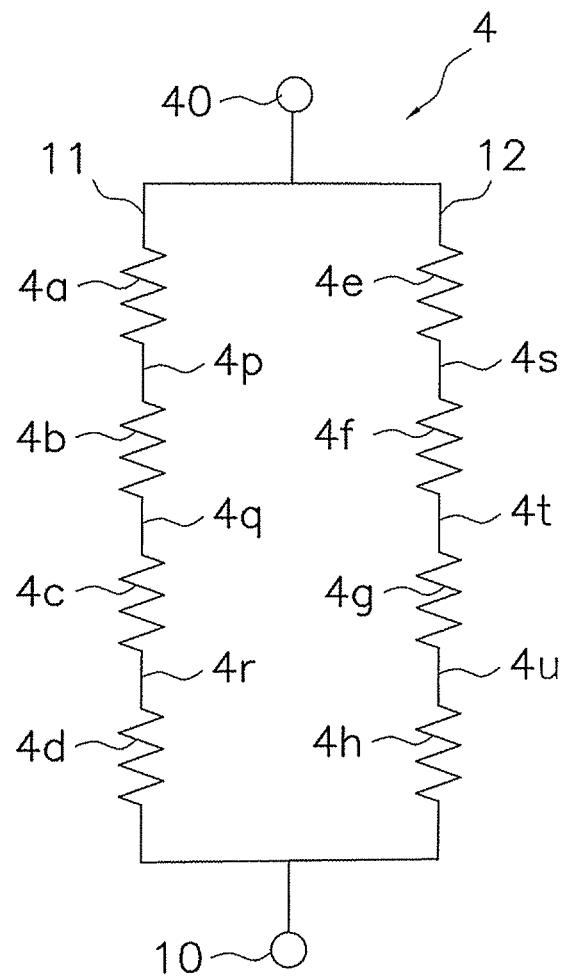
FIG. 3 is a diagram of a winding layout.

The U-phase winding 4 has a first winding 11 and a second winding 12, as shown in FIG. 3. Each of the first winding 11 and the second winding 12 is composed of a plurality of bundled wires W (see FIG. 6), e.g., 15 wires W. The U-phase winding 4 has eight coil parts 4a to 4h and six connecting portions 4p to 4u, as shown in FIGS. 1 and 3. FIG. 3 is a diagram of the layout of the U-phase winding 4. In the U-phase winding 4, the first winding 11 and the second winding 12 are connected in parallel. One end of the first winding 11 and one end of the second winding 12 are connected to the U-phase terminal 40, and the other end of the first winding 11 and the other end of the second winding 12 are connected to the neutral point 10. Among the coil parts 4a to 4h described above, coil parts 4a to 4d are provided to the first winding 11 and are connected in series. The coil parts 4e to 4h are provided to the second winding 12 and are connected in series.

The coil parts 4a to 4d are portions in which the winding 4 is formed in a coiled state. In the description below, the four coil parts 4a to 4d of the first winding 11 are referred to as the first coil part 4a to the fourth coil part 4d in sequence from the U-phase terminal 40 side. The four coil parts 4e to 4h of the second winding 12 are referred to as the fifth coil part 4e to the eighth coil part 4h in sequence from the U-phase terminal 40 side. The coil parts 4a to 4h are wound around and across a plurality of teeth. For example, in FIG. 2, the first coil part 4a is wound around and across from the first tooth T1 to the fifth tooth T5. Among the slots S1 to S48, the slot into which an input line In of the first coil part 4a is inserted is the first slot S1, and the slots in sequence in the counterclockwise direction from the first slot S1 in FIG. 2 are referred to as second slot S2 to $48^{th}$ slot S48. The tooth positioned between the first slot S1 and the second slot S2 is the first tooth T1, and the teeth in sequence in the counterclockwise direction from the first tooth T1 in FIG. 2 are referred to as the second tooth T2 to $48^{th}$ tooth S48. In the slots S1 to S48 and teeth T1 to T48, the inner side in the radial direction is referred to as the "tooth-tip side" and the outer side in the radial direction is referred to as the "tooth-base side." In FIGS. 1 and 2, the winding directions of the coil parts 4a to 4h are indicated by black dots and crosses.

The black dots indicate that the current flows in the direction from the nearside of the page toward the depth side. The crosses indicate that the current flows in the direction from the depth side of the page toward the nearside.

The first coil part 4a is inserted into the first slot S1 and the sixth slot S6. The coil side 41a closest to the U-phase terminal 40 among the plurality of coil sides of the first coil part 4a is positioned closest to the tooth tip among the coil sides inside the first slot S1, as shown in FIG. 2. The coil side 42a closest to the terminal end among the plurality of coil sides of the first coil part 4a is positioned closest to the tooth base among the coil sides inside the sixth slot S6. The term "coil side" refers to a portion that is inserted into the slots S1 to S48 among the coil parts 4a to 4h and that extends along the slots S1 to S48 (in the direction perpendicular to the page of FIG. 2).

The second coil part 4b is inserted into the seventh slot S7 and the $12^{th}$ slot S12. The coil side 41b closest to the U-phase terminal 40 among the plurality of coil sides of the second coil part 4b is positioned closes to the tooth tip among the coil sides inside the $12^{th}$ slot S12. The coil side 42b closest to the terminal end among the plurality of coil sides of the second coil part 4b is positioned closest to the tooth base among the coil sides inside the seventh slot S7. The winding direction of the second coil part 4b is opposite from the winding direction of the first coil part 4a.

The third coil part 4c is inserted into the $13^{th}$ slot S13 and the $18^{th}$ slot S18. The coil side 41c closest to the U-phase terminal 40 among the plurality of coil sides of the third coil part 4c is positioned closest to the tooth tip among the coil sides inside the $13^{th}$ slot S13. The coil side 42c closest to the terminal end among the plurality of coil sides of the third coil part 4c is positioned closest to the tooth base among the coil sides inside the $18^{th}$ slot S18. The winding direction of the third coil part 4c is the same as the winding direction of the first coil part 4a and is opposite from the winding direction of the second coil part 4b.

The fourth coil part 4d is inserted into the $19^{th}$ slot S19 and the $24^{th}$ slot S24. The coil side 41d closest to the U-phase terminal 40 among the plurality of coil sides of the fourth coil part 4d is positioned closest to the tooth tip among the coil sides inside the $24^{th}$ slot S24. The coil side 42d closest to the terminal end among the plurality of coil sides of the second coil part 4b is positioned closest to the tooth base among the coil sides inside the $19^{th}$ slot S19. The winding direction of the fourth coil part 4d is the same as the winding direction of the second coil part 4b and is opposite from the winding direction of the first coil part 4a and third coil part 4c.

The structure of the fifth coil part 4e to the eighth coil part 4h (see FIG. 1) is the same as that of the first coil part 4a to fourth coil part 4d described above. In other words, the winding direction of the fifth coil part 4e and the seventh coil part 4g is the same as the winding direction of the first coil part 4a, and the winding direction of the sixth coil part 4f and the eighth coil part 4h is the same as the winding direction of the second coil part 4b. In other words, the eight coil parts 4a through 4h of the U-phase winding 4 have winding directions that are opposite from each other in alternating fashion.

The connecting portions 4p to 4u shown in FIG. 1 are portions that span the coil parts 4a to 4d and the coil parts 4e to 4h of the winding 4. As described above, the coil sides (e.g., the coil sides 41a, 41b, 41c, 41d shown in FIG. 2) of the most U-phase terminal 40 side among the coil sides of the coil parts 4a to 4h are positioned on the tooth-tip side of the slots S1 to S48, and the coil sides (e.g., the coil sides 42a, 42b, 42c, 42d shown in FIG. 2) of the most neutral point 10 side are positioned on the tooth-base side of the slots S1 to S48. Accordingly, the connecting portions 4p to 4r are provided across from the tooth-tip side to the tooth-base side between the coil parts 4a to 4d, as shown in FIG. 2. Although not shown, the same applies to the connecting portions 4s to 4u. Hereinbelow, the connecting portion connecting the first coil part 4a and the second coil part 4b in the first winding 11 is referred to as the first connecting portion 4p, and the connecting portions connected thereafter to the third coil part 4c and the fourth coil part 4d are referred to in sequence as the second connecting portion 4q and the third connecting portion 4r, as shown in FIG. 3. The same applies to the second winding 12, wherein the connecting portion connecting the fifth coil part 4e and sixth coil part 4f to the connecting portion connecting the seventh coil part 4g and the eighth coil part 4h are referred to as the fourth connecting portion 4s to sixth connecting portion 4u.

The first connecting portion 4p is provided across from the tooth-base side of the sixth slot S6 to the tooth-tip side of the $12^{th}$ slot S12. The second connecting portion 4q is provided across from the tooth-base side of the seventh slot S7 to the tooth-tip side of the $13^{th}$ slot S13. The third connecting portion 4r is provided across from the tooth-base side of the $18^{th}$ slot S18 to the tooth-tip side of the $24^{th}$ slot S24. The fourth connecting portion 4s is provided across from the tooth-base side of the $30^{th}$ slot S30 to the tooth-tip side $36^{th}$ slot S36 (not shown). The fifth connecting portion 4t to the sixth connecting portion 4u have the same configuration as the first connecting portion 4p to third connecting portion 4r, and a description is omitted.

Figure 4:
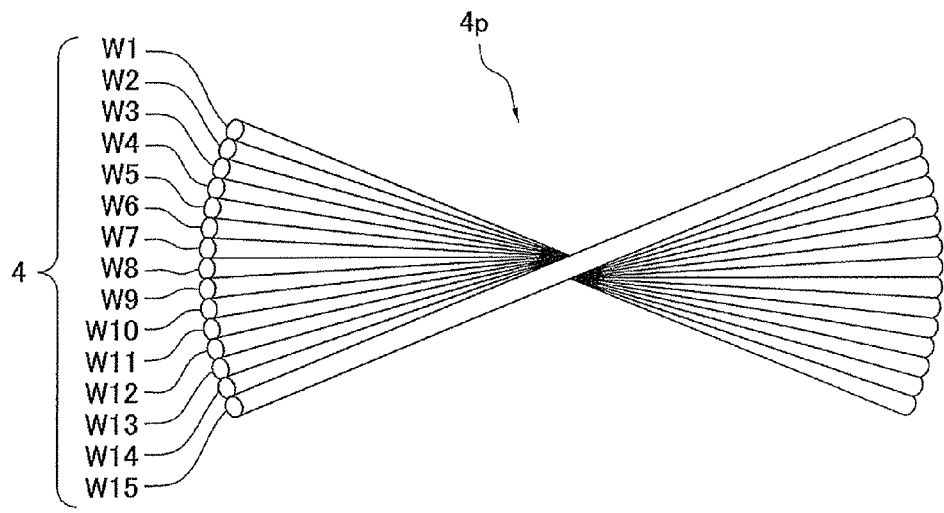
FIG. 4 is a diagram showing connecting portions of the winding.
Figure 5:
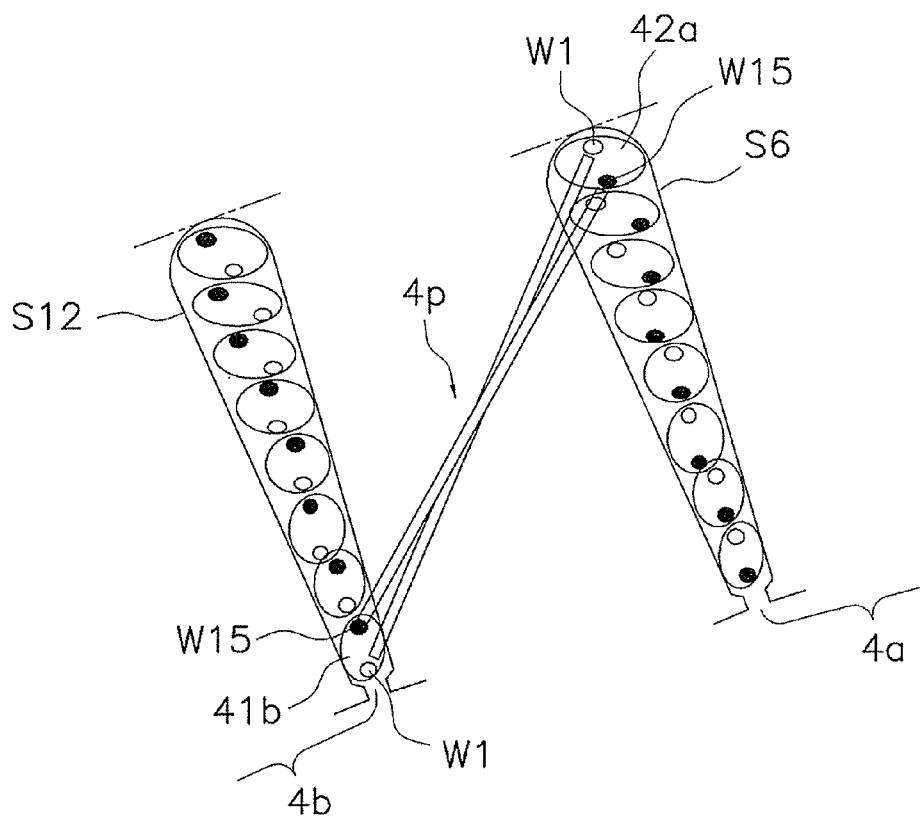
FIG. 5 is a schematic view of coil parts and the connecting portions.
Figure 6:
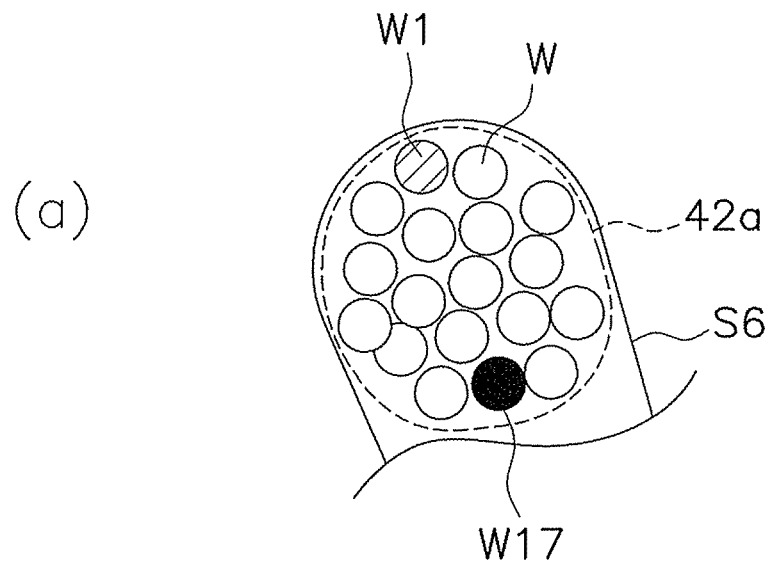
FIG. 6 is a view showing the position of wires in the coil part.
Figure 6:
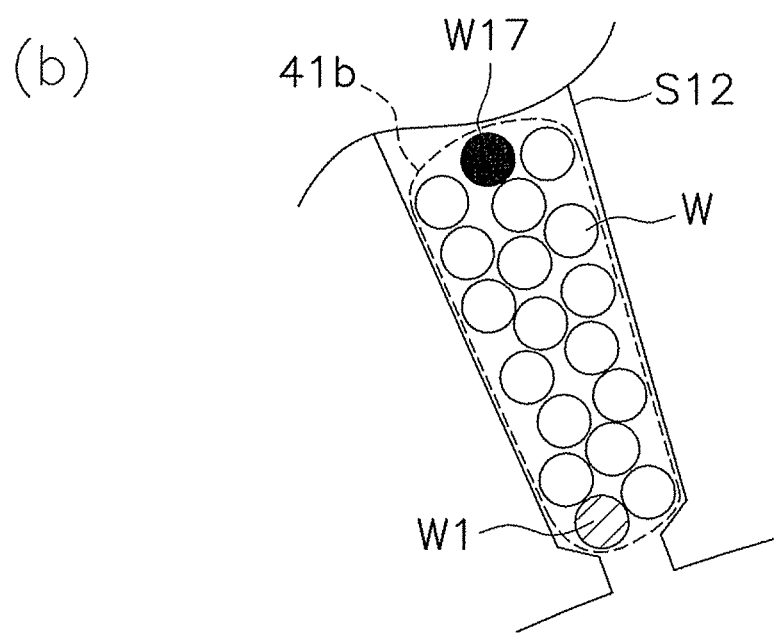

In the first connecting portion 4p, the winding 4 has a 180° twisted shape, as shown in FIGS. 4 and 5. Accordingly, the first wire W1 positioned closest to the tooth base among the plurality of wires W in the coil side 42a closest to the tooth base in the sixth slot S6 is positioned closest to the tooth tip among the plurality of wires W in the coil side 41b closest to the tooth tip of the $12^{th}$ slot S12, as shown in FIG. 6. The $15^{th}$ wire W15 positioned closest to the tooth tip in the coil side 42a closest to the tooth base in the sixth slot S6 is positioned closest to the tooth base in the coil side 41b closest to the tooth tip in the $12^{th}$ slot S12. Therefore, the first wire W1 is positioned closest to the tooth base in each of the coil sides of the sixth slot S6, and is closest to the tooth tip in each of the coil sides of the $12^{th}$ slot S12, as shown in FIG. 5. The $15^{th}$ wire W15 is positioned closest to the tooth tip in each of the coil sides of the sixth slot S6, and closest to the tooth base in each of the coil sides of the $12^{th}$ slot S12. In FIG. 5, white circles all indicate the first wire W1, and the shaded circles all represent the $15^{th}$ wire W15.

The same applies to the other wires W in that the positions on the tooth-tip side and the tooth-base side are interchanged in each of the coil sides of the sixth slot S6 and the $12^{th}$ slot S12

In the second connecting portion 4q to sixth connecting portion 4u as well, the winding 4 has a shape twisted 180° in the same manner as the first connecting portion 4p.

Characteristics

Figure 7:
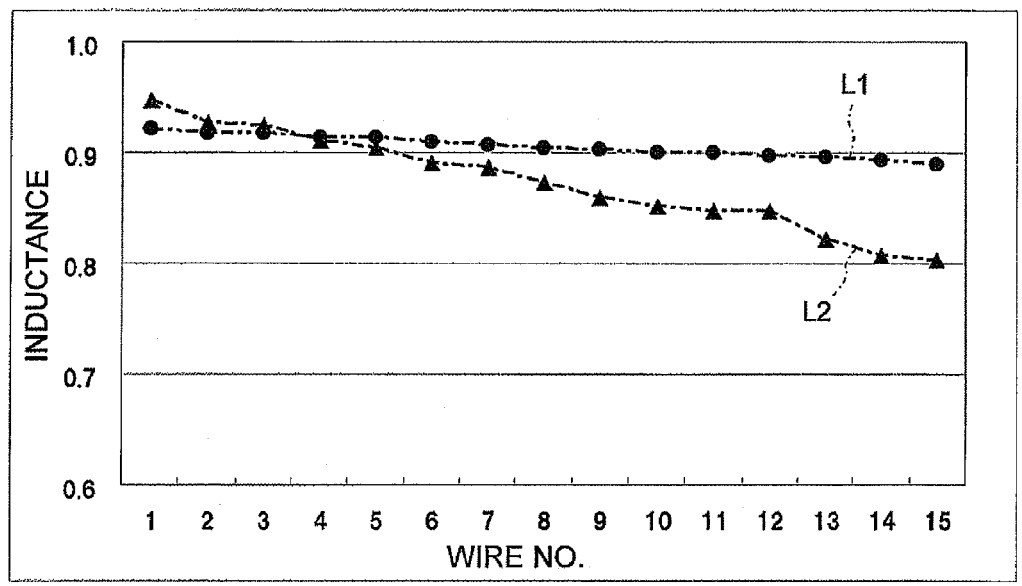
FIG. 7 is a graph showing the inductance of the wires.
Figure 8:
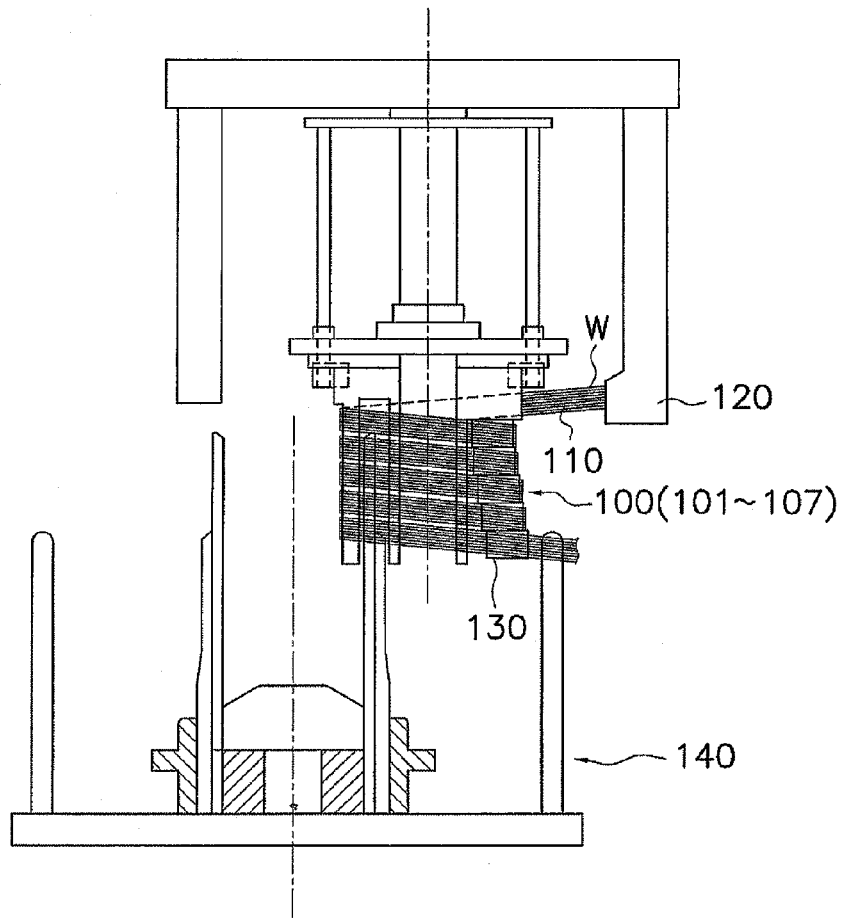
FIG. 8 is a diagram showing a conventional stator coil manufacturing device.
Figure 9:
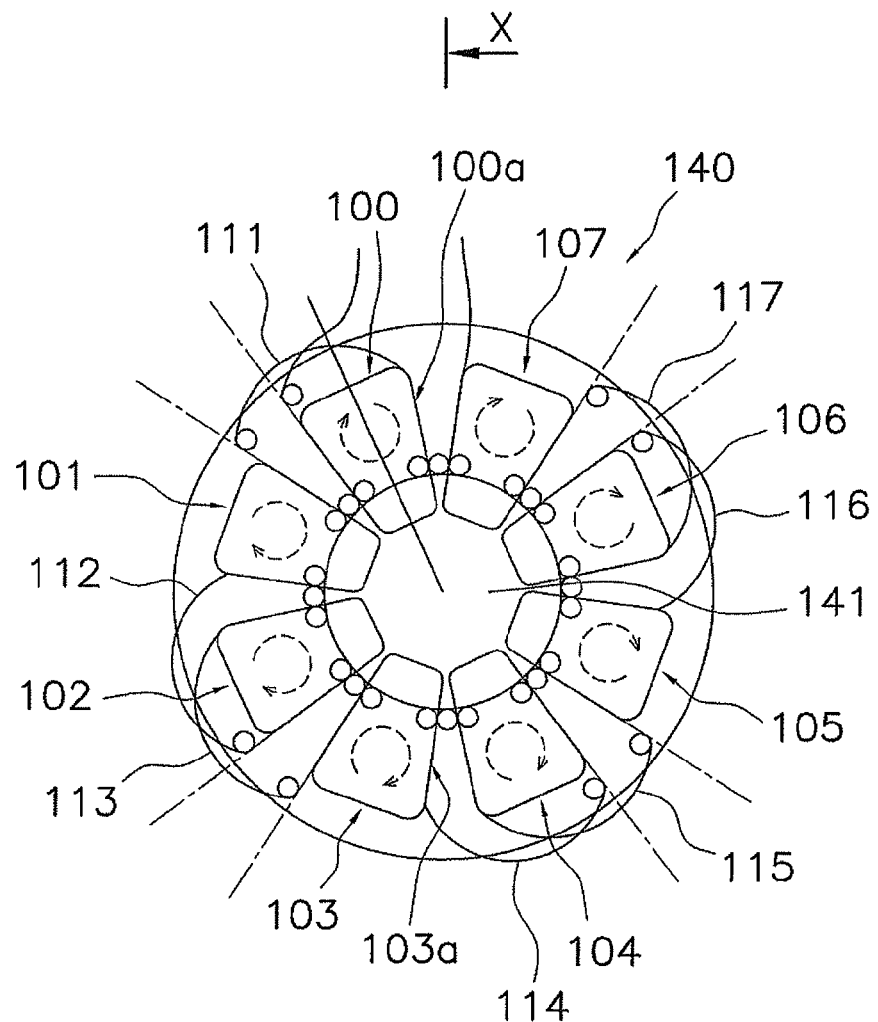
FIG. 9 is a diagram showing a conventional stator coil manufacturing device.
Figure 10:
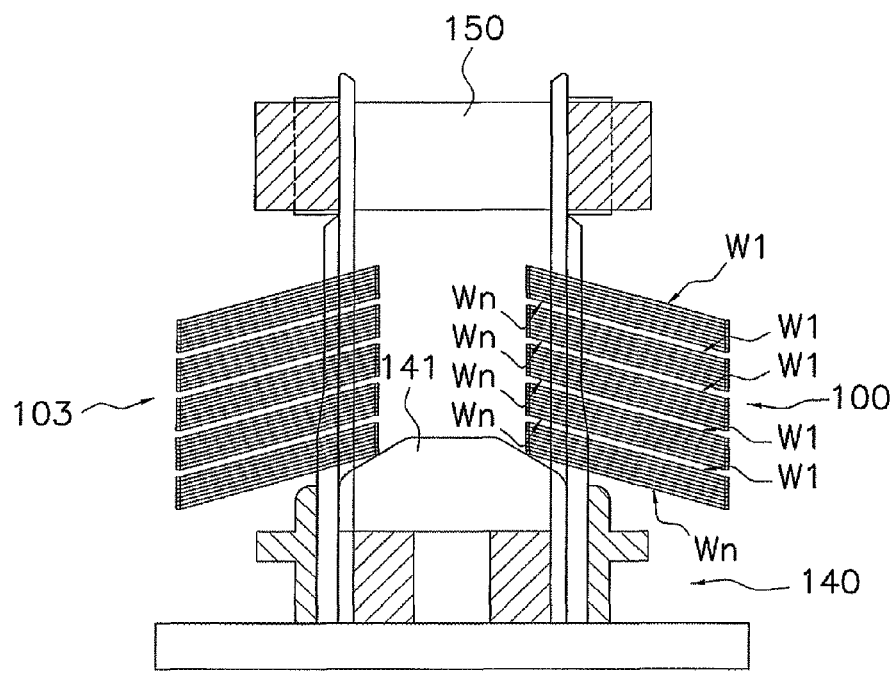
FIG. 10 is a diagram showing a conventional stator coil manufacturing device.
Figure 11:
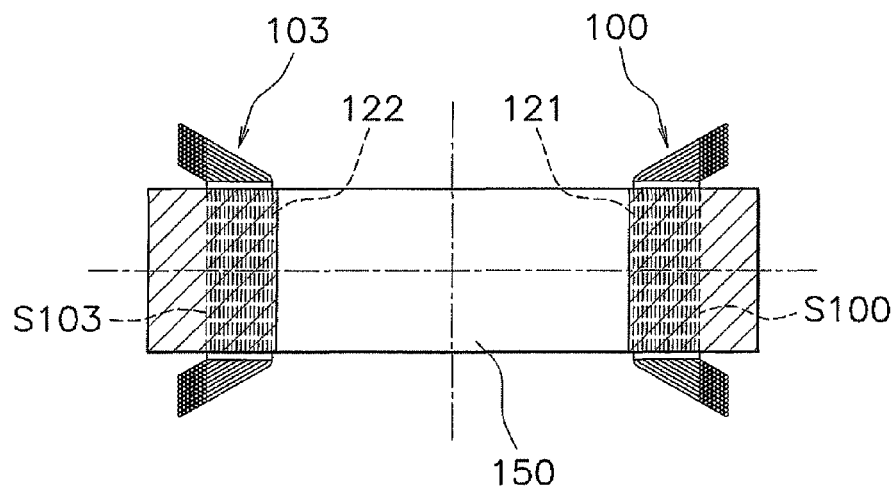
FIG. 11 is a diagram showing a conventional stator coil manufacturing device.
Figure 12:
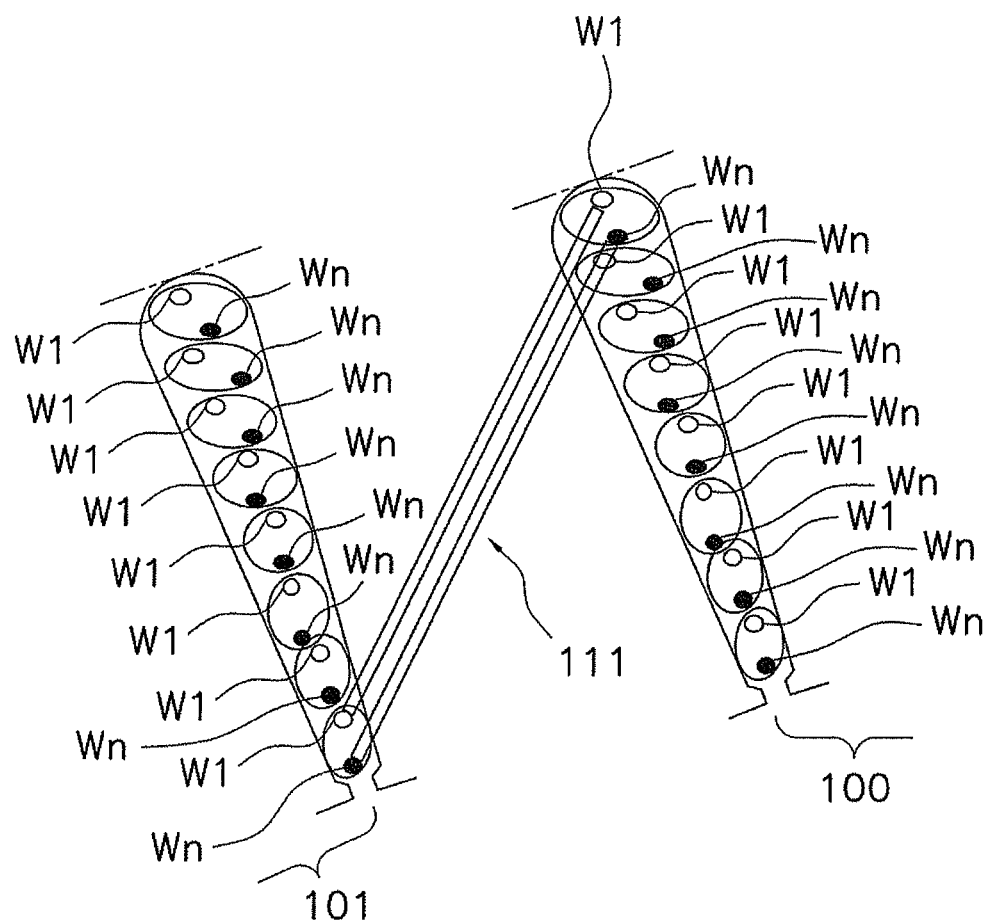
FIG. 12 is a schematic view of coil parts and connecting portions in a conventional stator coil.
Figure 13:
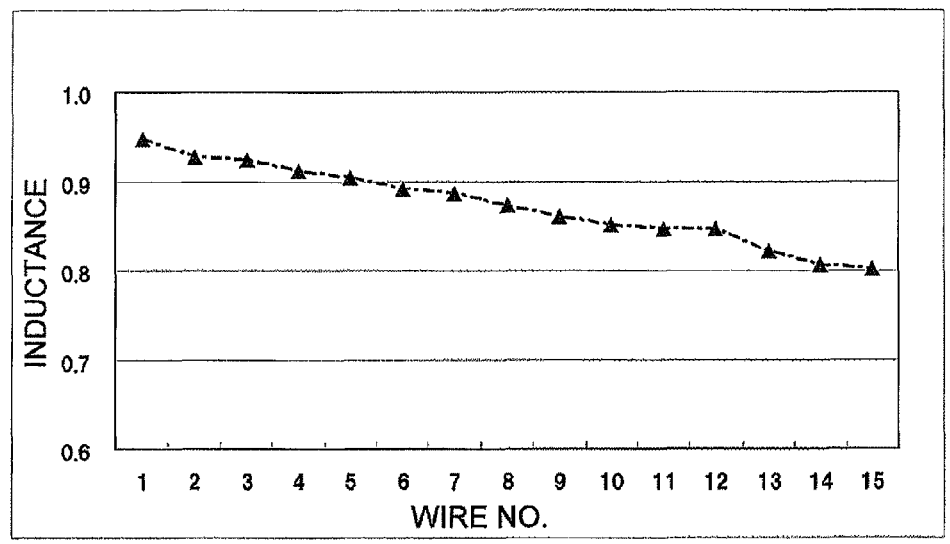
FIG. 13 is a graph showing the inductance of the wires W in a conventional stator coil.

FIG. 7 shows measured data of the inductance of the wires of the stator coil described above. The data of the inductance of the first wire W1 to $15^{th}$ wire W15 of the stator 3 according to the present invention, and the data of the inductance of the wires W1 to W15 of the stator provided to a conventional electric motor were measured at the two ends of the four coil parts of the first winding 11. In FIG. 7, the line L1 indicates the inductance of the wires W1 to W15 in the electric motor 1 according to the present embodiment. The line L2 indicates the inductance of the wires W1 to W15 in a conventional electric motor.

With the conventional stator, inductance is dramatically reduced from the wire W1 to the wire W15, but in contrast, a reduction in inductance is considerably suppressed from the wire W1 to the wire W15 in the stator 3 according to the present embodiment.

In the conventional stator, the amount of nonuniformity of inductance for each wire is large. Therefore, a large amount of current flows through wires W having low inductance and the overall efficiency of the coil is reduced in the case that the same alternating voltage is simultaneously applied to the bundle of wires W. On the other hand, in accordance with the stator 3 of the present embodiment, reduction of the overall efficiency is suppressed because the inductance nonuniformity among the wires W is reduced, and the resulting coil efficiency will be higher than can be obtained with a conventional electric motor.

The higher the coil efficiency is, i.e., the extent to which more magnetic flux is generated, the higher the torque is that can be generated when the same current allowed to flow. Therefore, the motor efficiency is higher. For this reason, the electric motor 1 of the present embodiment can be made to have higher efficiency than with a conventional electric motor. Making the motor more efficient than with a conventional configuration yields a higher output, a smaller size, and reduced weight.

Other Embodiments (a) The number of slots and teeth of the core, the number of wires constituting the windings, and the number of coil parts and connecting portions is not limited to the quantities in the description above; it is possible to use different quantities.

(b) In the embodiment described above, the armature according to the present invention is provided as a stator to an electric motor, but the armature according to the present invention may be provided as a rotor to an electric motor.

(c) In the embodiment described above, the windings may have a twisted shape in all of the connecting portions, but it is also possible for the windings to have a twisted shape in a portion of the connecting portions. For example, the windings may have a twisted shape in the second and fifth connecting portions 4q, 4t. In this case as well, the inductance can be averaged out in the same manner as described above, and the same effect as that described above can be obtained.

(d) In the embodiment described above, the U-phase winding 4 has a first winding 11 and second winding 12 connected in parallel, but all of the coil parts may be connected in series. For example, all of the eight coil parts as described in the embodiment above may be connected in series. In this case as well, the windings may have a twisted shape in all of the connecting portions, and the windings may also have a twisted shape in a portion of the connecting portions.

The positions of the connecting portions in which a twist is formed are different depending on the number of poles of the rotor 2 of the motor. The number of coils in a stator winding corresponds to the number of poles of the rotor 2 of the motor, and in the case that the number of poles of the rotor 2 of the motor is, e.g., four, the number of coils is also four. In this case, the number of connecting portions is three, and a twist of 180° is formed in the second crossover wire or a twist of 180° is preferably made in all the crossover wires.

In the case of a multiphase motor, the positions of the connecting portions in which a twist is formed are preferably matched in each phase in order to balance the coil state in each phase.

The illustrated embodiment has the effect of improving the motor efficiency, and is useful as an armature of an electric motor and as an electric motor.

The invention claimed is:

1. An armature for an electric motor, the armature comprising:
    a substantially cylindrical core including a plurality of slots and a plurality of teeth formed between the slots, the slots and teeth being arranged along a circumferential direction of the core; and
    a distributed winding made of a bundled plurality of wires, the winding including a plurality of coil parts arranged adjacent one another in the circumferential direction and a plurality of connecting portions connecting the coil parts together, each of the coil parts comprising a plurality of turns of the bundled plurality of wires around the teeth disposed between two non-adjacent slots among the slots such that the coil part is disposed in the two non-adjacent slots and spans across the teeth disposed circumferentially between the two non-adjacent slots, the winding having a twisted shape in each of the connecting portions.

2. The armature according to claim 1, wherein the connecting portions extend from a tip side of the teeth to a base side of the teeth.

3. The armature according to claim 1, wherein the winding is twisted at an angle of 180° in the connecting portions.

4. An electric motor comprising the armature according to claim 1 as a stator.

5. The armature according to claim 1, wherein
    a plurality of the distributed winding is provided, each of the distributed windings corresponding to a different phase and being made of a separate bundled plurality of wires, the coil parts corresponding to each of the different phases being ayouml around the teeth disposed between different pairs of non-adjacent slots among the slots such that the coil parts of the different phases are offset from one another in the circumferential direction.

6. The armature according to claim 5, wherein
    there are three of the distributed windings, each of the distributed windings corresponding to one of three different phases.

7. The armature according to claim 5, wherein
    each of the distributed windings comprising a first winding and a second winding connected in parallel, each of the first and second windings being made of a seperate bundled plurality of wires, and each of the first and second windings including a plurality of the coil parts and a plurality of the connecting portions.

8. The armature according to claim 6, wherein
    each of the three distributed windings comprising a first winding and a second winding connected in parallel, each of the first and second windings being made of a separate bundled plurality of wires, and each of the first and second windings including a.plurality of the coil parts and a plurality of the connecting portions.

* * * * *